US006888269B1

(12) United States Patent
Arndt et al.

(10) Patent No.: US 6,888,269 B1
(45) Date of Patent: May 3, 2005

(54) MAGNETIC LINEAR DRIVE

(75) Inventors: Andreas Arndt, Algermissen (DE); Wolf Rüdiger Canders, Osterode/Harz (DE); Karl Mascher, Berlin (DE); Klaus Schuler, Berlin (DE); Holger Gerhard Wisken, Wittengen (DE); Hardo May, Braunschweig (DE); Herbert Weh, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 396 days.

(21) Appl. No.: 10/018,845

(22) PCT Filed: Jun. 20, 2000

(86) PCT No.: PCT/DE00/01981

§ 371 (c)(1),
(2), (4) Date: Dec. 21, 2001

(87) PCT Pub. No.: WO00/79672

PCT Pub. Date: Dec. 28, 2000

(30) Foreign Application Priority Data

Jun. 22, 1999 (DE) ........................................ 199 29 572

(51) Int. Cl.[7] ................................................ H02K 41/00
(52) U.S. Cl. ........................................... 310/12; 310/15
(58) Field of Search ............................................ 310/12

(56) References Cited

U.S. PATENT DOCUMENTS

| | | | | |
|---|---|---|---|---|
| 3,379,214 A | | 4/1968 | Weinberg | |
| 4,817,494 A | | 4/1989 | Cowan | |
| 5,394,131 A | | 2/1995 | Lungu | |
| 5,719,451 A | | 2/1998 | Cook et al. | |
| 5,729,067 A | * | 3/1998 | Janutka | 310/135 |

FOREIGN PATENT DOCUMENTS

| | | |
|---|---|---|
| DE | G 74 32 801.1 | 9/1974 |
| EP | 0 127 692 A1 | 12/1984 |
| EP | 06270673 | 9/1994 |
| GB | 829782 | 3/1956 |
| GB | 1068610 | 10/1964 |
| NL | C 1006087 | 2/1999 |

* cited by examiner

*Primary Examiner*—Nicholas Ponomarenko
*Assistant Examiner*—Iraj A. Mohandesi
(74) *Attorney, Agent, or Firm*—Morrison & Foerster LLP

(57) ABSTRACT

A magnetic linear drive has a coil in whose interior the current can produce a magnetic flux in an axial directions, having an armature which can move only at right angles to the axial direction and which has a magnetically active part which is magnetized, in particular, parallel to, but in the opposite direction to, the axial direction. The armature is driven by a current surge which accelerates the magnetically active part toward the coil center irrespective of its initial position.

11 Claims, 3 Drawing Sheets

MAGNETIC LINEAR DRIVE

CLAIM FOR PRIORITY

This application claims priority to International Application No. PCT/DE00/01981 which was filed on Jun. 20, 2000.

TECHNICAL FIELD OF INVENTION

The invention relates to a magnetic linear drive, in particular for an electrical switch, having a coil through which a current can be passed and in whose interior the current can produce a magnetic flux in an axial direction, having an armature which can move only at right angles to the axial direction and which has a magnetically active part whose movement path passes through an airgap within a core which passes through the coil, or passes one end face of the core, with the magnetically active part being demagnetized or magnetized in such a manner that the magnetic flux runs parallel to the axial direction, or parallel to it but in the opposite direction, within the magnetically active part.

BACKGROUND OF THE INVENTION

A magnetic linear drive for accelerating a projectile U.S. Pat. No. 4,817,494.

U.S. Pat. No. 5,719,451 also describes a magnetic linear drive where it is used, for example, in pumps for liquids. The linear drives described therein have the common feature that a magnet coil accelerates an armature in the axial direction of the coil.

Further, GB 10 68 61 0 describes a magnetic linear drive. The drive described therein is a drive for a valve in which a channel for liquid is shut off or opened by the movement of an armature.

There, the armature has a permanent magnet whose magnetic flux in its interior is directed in the movement direction of the armature, and at right angles to the axial direction.

At each of its limit positions, the armature runs into mechanical stops such that one pole of the permanent magnet always comes into contact with the stop, and such that the magnetic effect of the permanent magnet holds it against the stop.

If a current is passed through the coil, then the magnetic effect of the current first of all has to cross the holding force of the permanent magnet against the stop. This results in a delay to the armature acceleration. Furthermore, during its movement toward a limit position, the armature is drawn toward the stop only immediately before reaching it, since the airgap located between the pole of the permanent magnet and the stop surface becomes sufficiently reduced in size only toward the end of the movement.

SUMMARY OF THE INVENTION

DETAILED DESCRIPTION OF THE PREFERRED EMBODIMENTS

Figure 1:
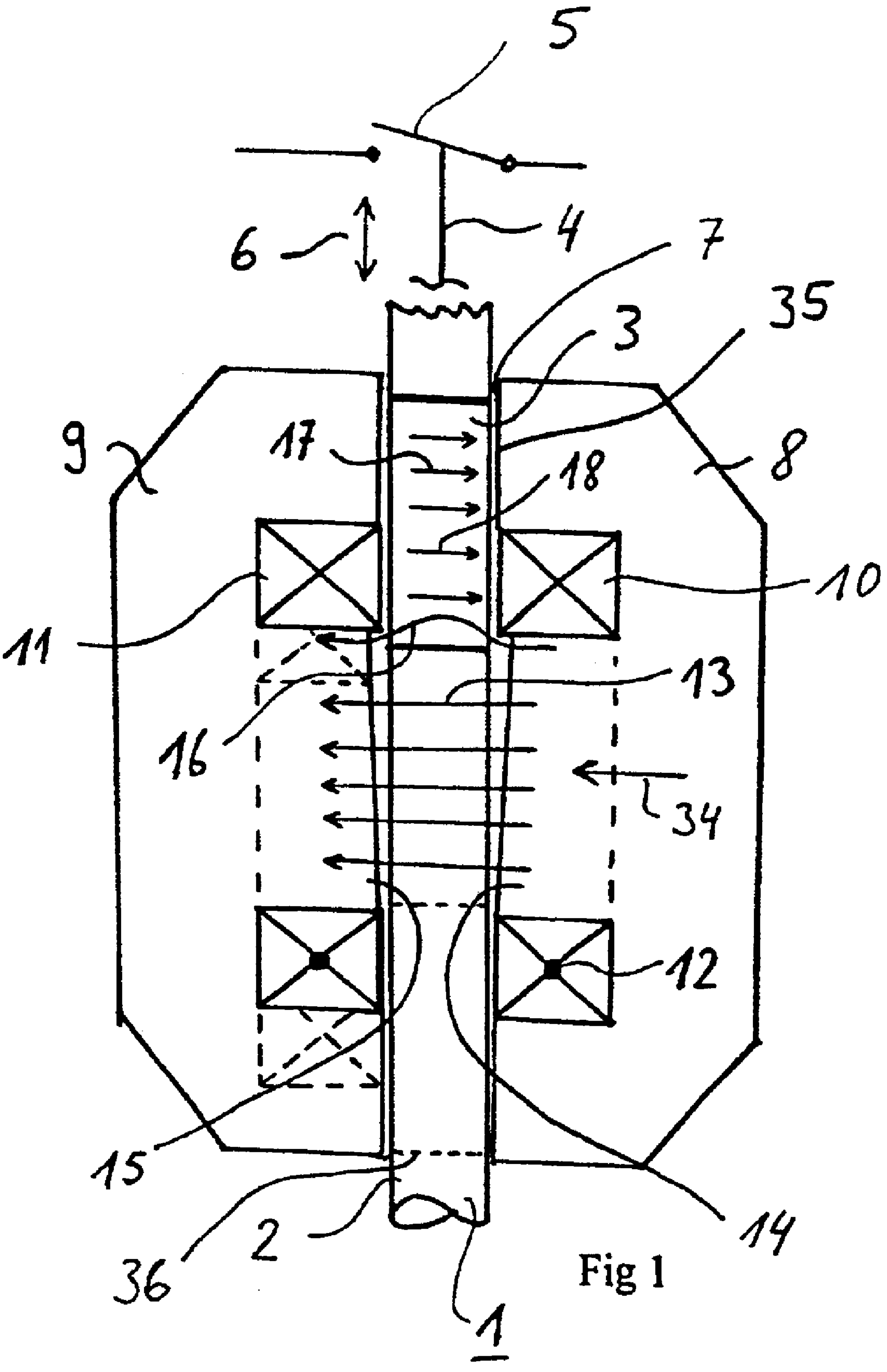
FIG. 1 schematically shows the magnetic linear drive in the form of a cross section, according to an embodiment of the invention.

The present invention provides a magnetic linear drive which achieves undelayed acceleration of the armature with little design complexity and with little control complexity.

According to an embodiment of the invention, the magnetically active part can be positioned permanently in two limit positions and can be moved from a first limit position to a second limit position by the influence of a current.

When a current is passed through the coil, a magnetic flux is produced in the axial direction in its interior, runs within the core and emerges from the core in the region of the airgap. A magnetically active part of an armature which, for example, is ferromagnetically demagnetized or magnetized, in particular being permanent-magnetized in a direction opposite to but parallel to the direction of magnetic flux of the coil, is accelerated toward the coil interior. A magnet, whose internal magnetic flux is aligned parallel to the flux of the coil, is repelled out of the interior of the coil. This effect is used to drive the armature.

Especially if the magnetically active part is magnetized ferromagnetically or as a permanent magnet parallel to, but in the opposite direction to, the axial direction, the magnetic linear drive can advantageously be used as a switch drive for an electrical switch, for example, a high-voltage circuit breaker or a vacuum interrupter.

If the armature is located at a limit position of its movement path such that, when the coil current is switched on, a small proportion of the magnetic flux of the coil passes through the magnetically active part, then this leads to the armature being accelerated toward the coil center, until the maximum proportion of the magnetic flux of the coil passes through the magnetically active part. During the movement of the armature, the current flow through the coil is interrupted by a control device, so that the armature moves further out from the coil by virtue of its kinetic energy and the kinetic energy of the driven masses, without any possibility of the magnetic flux of the coil being able to brake the armature by any influence on the magnetically active part.

This ensures optimum acceleration of the armature at the start of the movement.

A desired a rmature acceleration profile can be achieved, for example, by designing the airgap to have different widths along the movement path between the core and the movement path of the magnetically active part. The narrower the airgap in a specific region along the movement path, the greater is the force that acts on the armature in this region.

By way of example, a drive rod of an electrical switch is connected to the armature, and itself drives a switching contact of an interrupter unit.

Mechanical stops can be provided in the region of the switching rod, or in the region of the linear drive itself.

One embodiment of the invention provides that the magnetically active part is magnetized, and that, in at least one limit position of the magnetically active part, this part is arranged at least partially in the region of a yoke body which is arranged outside the coil, such that the magnetic flux emerging from the magnetically active part, or entering it, passes at least partially directly through a boundary surface of the yoke body facing the magnetically active part.

The boundary surface is preferably aligned essentially at right angles to the axial direction.

In the situation where the magnetically active part is magnetized, for example as an electromagnet, or is permanently magnetized, the magnetic flux of the magnetically active part has the tendency to reduce the size of the airgap from a yoke body, which is arranged adjacent, as much as possible.

At least one yoke body is preferably arranged in the end region of the movement path of the armature, which the magnetic flux of the magnetically active part can enter, at least over a portion of the length of the magnetically active part.

The armature is thus subject to a force which attempts to produce as much overlap as possible between the magnetically active part and the yoke body, such that, as far as possible, the entire magnetic flux of the magnetically active part can enter the yoke body through a boundary surface which is arranged as far as possible at right angles to the axial direction. The force acting in the direction of the movement path of the armature is essentially independent of the extent to which the magnetically active part and yoke body overlap.

This results in a holding force which is essentially independent of the position of the armature in the end region of the movement, and holds the armature in one of its limit positions.

Such an arrangement can advantageously be provided for both limit positions of the magnetically active part or armature.

A further embodiment of the invention provides that a second coil is located opposite the coil with respect to the movement path of the magnetically active part and a current can be passed through it in the same direction sense as the first coil.

Two coils that are combined in the illustrated manner make it possible to produce a correspondingly greater magnetic flux, which leads to greater potential acceleration of the armature.

It can furthermore be provided for the first coil and the second coil to be offset with respect to one another in the movement direction of the armature.

Such an offset of the coils in the movement direction of the armature with respect to one another makes it possible to achieve a specific acceleration profile along the movement path.

It is also possible to provide for each of the coils to be used for in each case one of the movement directions of the armature.

It is also preferable to provide two yoke bodies which are opposite one another with respect to the movement path of the magnetically active part and form airgaps between them, through which at least part of the movement path of the magnetically active part passes.

A further yoke body, which is opposite the first yoke body with respect to the movement path of the magnetically active part, makes it possible to close the magnetic circuit both for the flux through the coil and for the flux of the magnetically active part in each of the limit positions, thus in each case resulting in a large amount of force being produced both for acceleration and for the holding force in the limit positions.

A further embodiment of the invention provides that a number of energy-storage capacitors, which can be charged and can be connected jointly or alternatively to a coil on a case-by-case basis, are provided in the control device.

The various energy-storage capacitors can be used for different switching situations (for example different load situations in a circuit breaker that is to be driven), or can be used differently for connection and disconnection.

An embodiment of the invention provides a method for operating a magnetic linear drive, which provides that the coil in each case has a current passed through it in the same direction in order to drive the armature in different directions.

Irrespective of which limit position the armature or the magnetically active part is located in, it is accelerated toward the coil interior when a magnetic flux is produced in the interior of the coil. If the current through the coil is interrupted at the right time, then the armature moves to the respective other limit position. This makes it considerably easier to drive the coil.

The method according to an embodiment of the invention can advantageously be refined such that the passing of a current is ended before the magnetically active part has reached its limit position.

A further embodiment of the invention provides that the current flow through the coil is interrupted as soon as the supply voltage changes its mathematical sign owing to an electrical oscillation process.

Since the coil represents an electrical inductance and a resistance, and is normally supplied by means of a capacitance, this results in an electrical resonant circuit in the drive for the linear drive. This leads to the creation of an electrical oscillation, so that the supply voltage applied to the coil reverses its mathematical sign at some time.

This would result in reversal of the magnetic flux, which would mean a reversal of the magnetic force acting on the magnetically active part, which is undesirable. The supply voltage is thus preferably monitored, and the current flow through the coil is interrupted as soon as the supply voltage reverses its mathematical sign.

According to an embodiment of the invention, it is also possible to provide for the current flow to be diverted to an energy-storage capacitor as soon as the supply voltage reverses its mathematical sign owing to an electrical oscillation process.

FIG. 1 shows a magnetic linear drive having an armature 1 which comprises a rod 2 made of glass-fiberreinforced plastic and a magnetically active part 3 made of permanently magnetic material, and to which, at one end, a switching rod 4 is coupled, which is illustrated only schematically and is connected to a drivable switching contact 5 of the interrupter unit of a high-voltage circuit breaker. The linear drive produces movements in the direction of the double arrow 6.

The armature 1 moves in the airgap 7 between a first yoke body 8 and a second yoke body 9, which are opposite one another, in a mirror-image symmetrical arrangement, with respect to the movement path of the armature 1.

Each of the yoke bodes has an annular recess, into each of which a coil 10, 11 is fitted. The coils 10, 11 are each provided with electrical connections and a current can be passed through them by means of a control device.

When a current is passed through at least one of the coils 10, 11, for example, the current direction is such that the current runs into the plane of the drawing in the upper part of the coil 10, and the current emerges from the plane of the drawing in the lower part of the coil, as is indicated by the dot 12.

This results in a magnetic flux being produced in the axial direction 34, which is represented by the arrows 13 and passes through a first core 14 of the first yoke body 8 within the coil 10, and through a second core 15 of the second yoke body 9 within the coil 11.

In the illustrated armature limit position, in which the armature is in contact with a mechanical stop in a manner that is not shown, a portion 16 of the magnetic flux 13 of the coils 10, 11 passes through an edge region of the magnetically active part 3 of the armature at this stage.

The rest of the magnetic flux 13 of the coils 10, 11 cross the broad airgap between the coils 14, 15, which is not bridged by the glass-fiber plastic body of the armature 1.

The magnetic flux accordingly has the tendency to accelerate the magnetically active part 3 downward in the illustration, so that the magnetic flux 13 of the coils 10, 11 passes through the magnetically active part 3 over as much of its length as possible and runs parallel to, but in the opposite direction to, the magnetic flux 17 produced in the interior of the magnetically active part 3.

When the magnetically active part 3 arrives approximately in the center of the coils 10, 11, the current flow through the coils 10, 11 is interrupted, to prevent the magnetic part from being braked when it emerges from the flux 13 of the coils 10, 11.

Owing to its kinetic energy, the armature continues to move until the magnetically active part 3 reaches a second limit position 36, which is represented by dashed lines.

In the movement region before reaching the limit position, the magnetic flux 17 within the magnetically active part 3 tries to enter one of the yoke bodies 8, 9, and emerge from it again, via an airgap which is as narrow as possible.

The holding forces acting on the armature in its limit positions will be described with reference to the upper limit position, as illustrated in FIG. 1.

When the current flow through the coils 10, 11 is interrupted, the magnetic flux 13 decays.

A portion of the magnetic flux 17 in the interior of the magnetically active part 3 can enter the yoke body 8 directly through the boundary surface 35, with the flux path being closed via the second yoke body 9 with the interposition of the unavoidable airgaps, so that the magnetic flux can emerge from there once again into the magnetically active part 3.

The portions 18 of the magnetic flux in the magnetically active part 3, which are at the same level as a coil winding 10, 11, cross a broad airgap to enter a yoke body 8. The illustrated constellation thus tries to move the magnetically active part 3 further upward, to achieve as great an overlap as possible between the length of the magnetically active part 3 and the portion of the yoke body 8 above the coil 10.

The magnetic force acting on the armature 1 is, in this case, largely independent of the extent to which the magnetically active part 3 already overlaps the portion of the yoke body 8 above the coil 10. The holding force on the armature in the limit position is thus largely independent of mechanical tolerances.

A corresponding situation applies to the other limit position of the armature, as illustrated by dashed lines.

It can also be seen from FIG. 1 that both yoke bodies 8, 9 are profiled along the movement path of the magnetically active part in the region of the cores 14, 15, such that the airgap between the armature 3 and the yoke bodies 8, 9 becomes broader in the upward direction. Thus the force acting on the magnetically active part 3 decreases during its upward movements. In this way, a high acceleration can be achieved at the start of the movement during disconnection of the interrupter unit, with the acceleration becoming weaker toward the end of the movement. It is also feasible, for example, for the second coil 11 to be offset downward along the movement path of the armature 1 with respect to the first coil 10, so that, during a disconnection process, that is to say a movement of the armature 1 in the upward direction, the second coil 11 would carry the main load of the acceleration initially, and the first coil 10 would carry it later.

This also allows specific profiling of the acceleration to be achieved.

Figure 2:
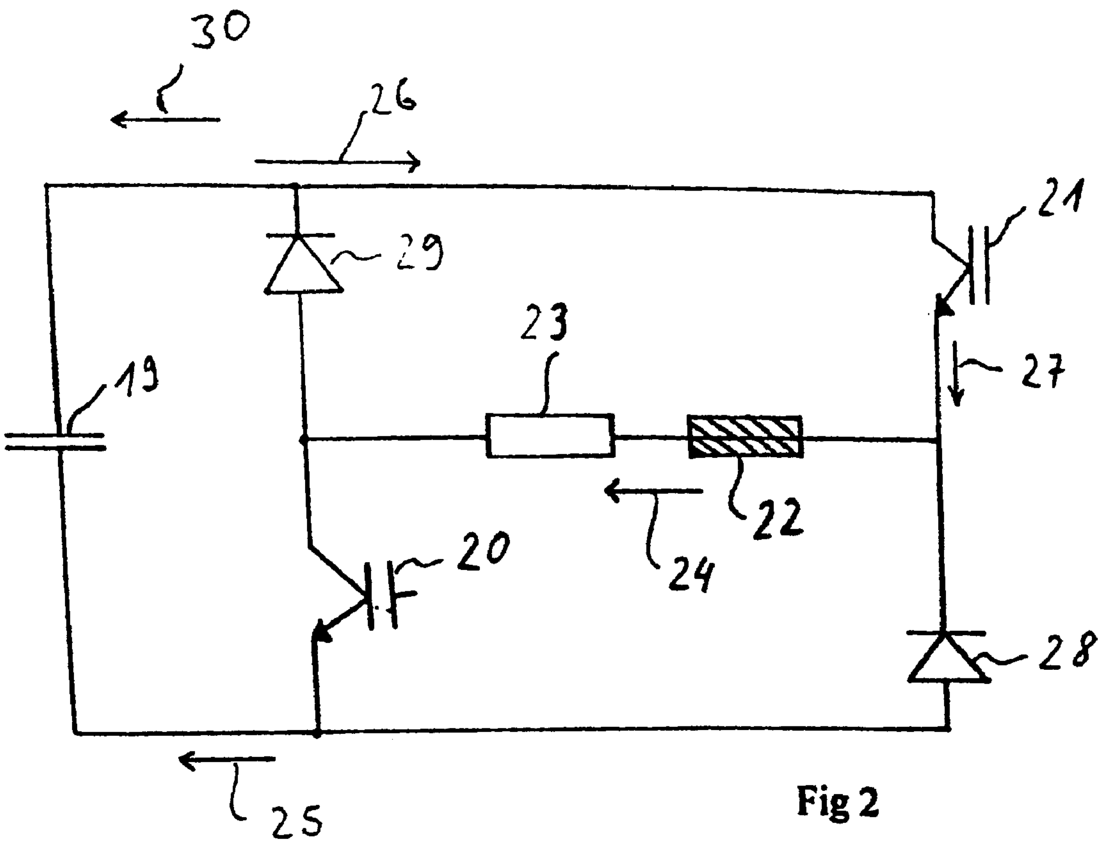
FIG. 2 shows a drive circuit for the coil for the linear drive, according to an embodiment of the invention.

FIG. 2 shows a drive circuit having an energy-storage capacitor 19 which can be connected via a first IGBT (insulated gate bipolar transistor) 20 and a second IGBT 21 to the coil 22 within the magnetic linear drive. 23 denotes the resistance of the coil 22, and its supply leads, symbolically.

When the IGBTs 20, 21 are switched on, a current flows through the coil 22 in the direction of the arrow annotated 24. This current flows through the first IGBT 20, and further along the arrows 25, 26, 27.

As the capacitor 19 discharges, the voltage across the coil 22 falls, where a back e.m.f. is induced, which tries to maintain the current density of the current 24. The back e.m.f. across the coil 22 opposes the supply voltage, so that this results in a voltage zero crossing. The IGBTs 21, 22 are switched off at this time, that is to say they block the current.

The current induced by the voltage within the coil 22 flows via the diodes 28, 29 in the direction of the arrow 30 back to the capacitor 19, partially recharging it. Energy is thus saved during operation of the linear drive and this is particularly important when a high-voltage switch that is driven by this drive needs to be operated in a standby mode by means of batteries.

Figure 3:
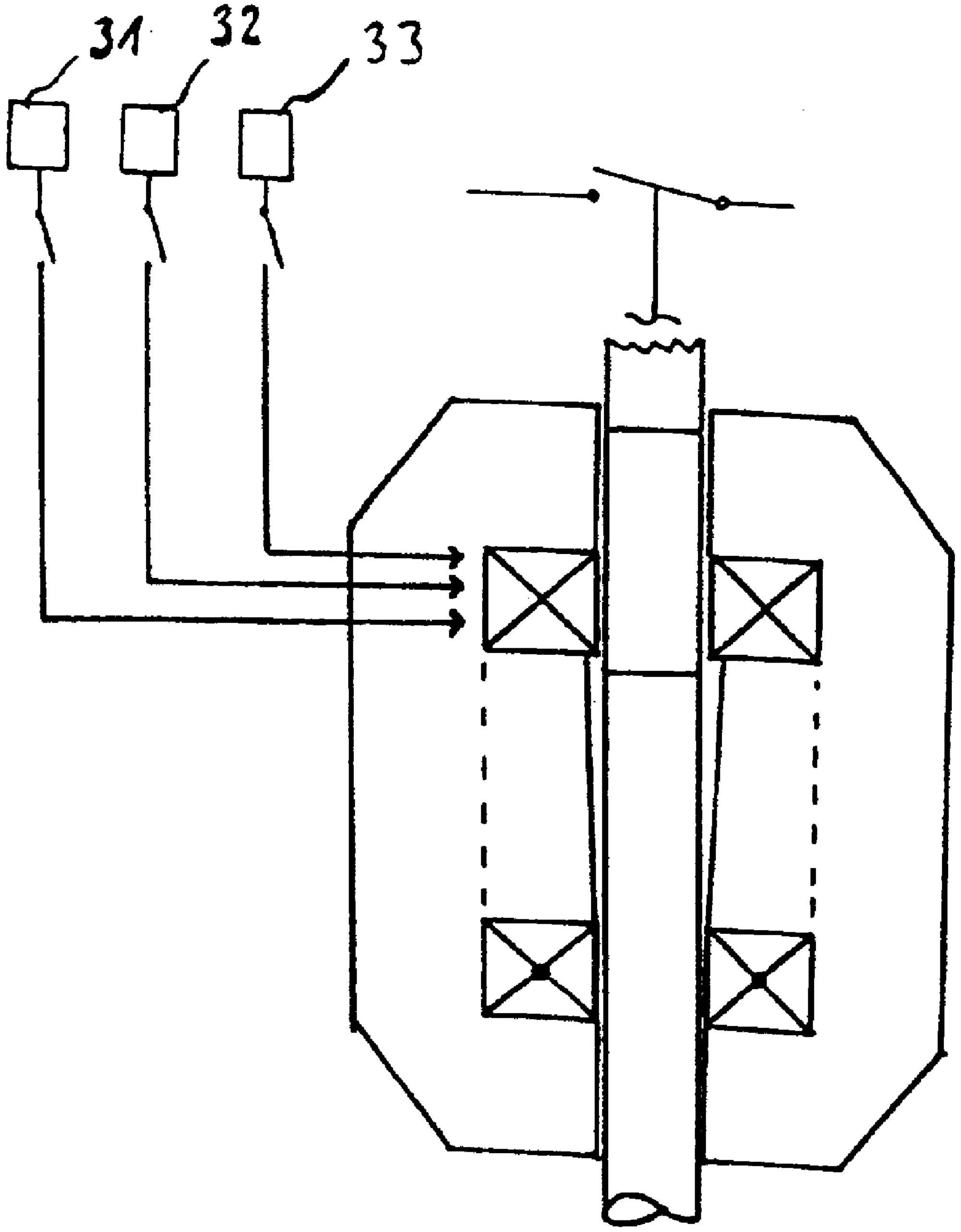
FIG. 3 schematically shows the power supply for the linear drive, according to an embodiment of the invention.

FIG. 3 shows, schematically, a linear drive being supplied with power via three different drive units 31, 32, 33, each of which has its own energy-storage capacitor, in which case the energy-storage capacitors may have different capacitances. In consequence, a different amount of energy, in the form of electrical field energy stored in the energy-storage capacitors, is in each case made available for different switching situations.

The various drives 31, 32, 33 can also be used for rapidly successive off-on-off switching operations.

What is claimed is:

1. A magnetic linear drive for an electrical switch, comprising: a coil through which a current passes the coil and the coil having an interior in which the current produces a magnetic flux in an axial direction, having an armature which moves only at right angles to the axial direction and which has a magnetically active part whose movement path passes through an airgap within a core which passes through the first coil, or passes one end face of the core, with the magnetically active part being demagnetized or magnetized in such a manner that the magnetic flux runs parallel to the axial direction, or parallel to the axial direction but in an opposite direction, within the magnetically active part, wherein the magnetically active part can be positioned permanently in a first and second limit position and can be moved from the first limit position to a further comprising a yoke body which is arranged outside the coil, second limit position by a current.

2. The magnetic linear drive as claimed in claim 1, wherein the magnetically active part is magnetized, and at least one limit position of the magnetically active part is arranged at least partially in a region of a yoke body, and the magnetic flux emerging from the magnetically active part, or entering it, passes at least partially directly through a boundary surface of the yoke body which faces the magnetically active part.

3. The magnetic linear drive as claimed in claim 1, further comprising a second coil located opposite the first coil with respect to a movement path of the magnetically active part and wherein, together with the first coil, a current can be passed through the second coil in a same direction sense as the first coil.

4. The magnetic linear drive as claimed in claim 1, wherein the first coil and the second coil are offset with respect to each another in the movement direction of the armature.

5. The magnetic linear drive as claimed in claim 1, further comprising two yoke bodies which are opposite each another with respect to the movement path of the magnetically active part and which form airgaps there between, through which at least part of the movement path of the magnetically active part passes.

6. The magnetic linear drive as claimed in claim 1, further comprising a control device including, a number of energy-storage capacitors which can be charged and can be alternatively connected jointly or to a coil.

7. A method for operating a magnetic linear drive having at least one coil through which a current passes, each of at least one coils, having an interior in which the current produces a magnetic flux in an axial direction, and an armature which moves at right angles to the axial direction and which has a magnetically active part whose movement path passes through an airgap within a core which passes through the coils or passes one end face of the core, with the magnetically active part being demagnetized or magnetized such that the magnetic flux runs parallel to the axial direction or parallel to the axial direction but in an opposite direction, within the magnetically active part which can be positioned permanently in a first and second limit position and can be moved from the first limit position to the second limit position by a current, comprising passing a current through the coils in a same direction to drive the armature in different directions.

8. The method as claimed in claim 7, wherein the passing of the current is ended before the magnetically active part has reached the second limit position.

9. The method as claimed in claim 8, wherein the current flow through the coils is interrupted as soon as a supply voltage changes its mathematical sign due to an electrical oscillation process.

10. The method as claimed in claim 8, wherein the current flow is diverted to an energy-storage capacitor as soon as a supply voltage changes its mathematical sign due to an electrical oscillation process.

11. A method for operating a magnetic linear drive having at least one coil through which a current passes, each of at least one coils, having an interior in which the current produces a magnetic flux in an axial direction, and an armature which moves at right angles to the axial direction and which has a magnetically active part whose movement path passes through an airgap within a core which passes through the coils or passes one end face of the core, with the magnetically active part being demagnetized or magnetized such that the magnetic flux runs parallel to the axial direction or parallel to the axial direction but in an opposite direction, within the magnetically active part which can be positioned permanently in a first and second limit position and can be moved from the first limit position to the second limit position by a current, comprising:

producing a current in the at least one coil whose resultant magnetic flux in the respective coil is parallel to, but in the opposite direction to, any magnetization of the magnetically active part, if the magnetically active part is magnetized: and reversing the direction through the at least one coil once the magnetically active part has reached the location of the greatest magnetic field strength of the coil on its movement path.

* * * * *